US012697624B2

(12) United States Patent
Lee

(10) Patent No.: US 12,697,624 B2
(45) Date of Patent: Aug. 4, 2026

(54) SOLAR PANEL RECYCLING AND SORTING MACHINE

(71) Applicant: MIT Marketing International Co., LTD., Taichung City (TW)

(72) Inventor: Mei-Chin Lee, Taichung City (TW)

(73) Assignee: MIT MARKETING INTERNATIONAL CO., LTD., Taichung City (TW)

( * ) Notice: Subject to any disclaimer, the term of this patent is extended or adjusted under 35 U.S.C. 154(b) by 304 days.

(21) Appl. No.: 18/409,410

(22) Filed: Jan. 10, 2024

(65) Prior Publication Data

US 2024/0226915 A1    Jul. 11, 2024

(30) Foreign Application Priority Data

Jan. 11, 2023    (TW) .................................. 112101155

(51) Int. Cl.
B03C 1/30        (2006.01)
B03C 1/16        (2006.01)
(Continued)

(52) U.S. Cl.
CPC .................. B03C 1/30 (2013.01); B03C 1/16 (2013.01); B09B 3/35 (2022.01); *B03C 2201/20* (2013.01); *B09B 2101/15* (2022.01)

(58) Field of Classification Search
CPC .................................... B03C 1/30; B09B 3/35
(Continued)

(56) References Cited

U.S. PATENT DOCUMENTS

| | | | |
|---|---|---|---|
| 9,289,781 B2 | 3/2016 | Yager | |
| 2013/0292501 A1* | 11/2013 | Sonoda | ................ H10K 71/221 |
| | | | 241/24.14 |
| 2018/0318842 A1 | 11/2018 | Korzenski | |

FOREIGN PATENT DOCUMENTS

| | | | | |
|---|---|---|---|---|
| CN | 113182070 B | * | 9/2022 | ............... B04C 9/00 |
| CN | 115318367 A | | 11/2022 | |

(Continued)

OTHER PUBLICATIONS

Fu; Yao-Xian, "Automatic Separation Equipment for Solar Cell Components Including a Crushing Device, a Shearing Device, a Grinding Device, and a Settling Device" (English Translation), Jun. 21, 2022, worldwide.espacenet.com (Year: 2022).*

(Continued)

*Primary Examiner* — Molly K Devine

(74) *Attorney, Agent, or Firm* — MUNCY, GEISSLER, OLDS & LOWE, P.C.

(57) ABSTRACT

A solar panel recycling and sorting machine includes a crushing device and a recycling device. The crushing device is provided with a crushing tank, and the crushing device is configured to project metal particles into the crushing tank. The recycling device includes a first conveyor belt, a first magnetic separator, a recycling tube, and a metal particle container. The metal particles from the crushing tank is configured to fall onto the first conveyor belt and be fed into the first magnetic separator. The first magnetic separator is configured to sort out the metal particles on the first conveyor belt using magnetic force and direct the metal particles into the recycling tube, allowing the metal particles to enter the metal particle container through the recycling tube.

4 Claims, 2 Drawing Sheets

(51) Int. Cl.
    *B09B 3/35*           (2022.01)
    *B09B 101/15*        (2022.01)

(58) Field of Classification Search
    USPC ........................................ 209/313; 241/24.14
    See application file for complete search history.

(56)                    References Cited

FOREIGN PATENT DOCUMENTS

| | | | |
|---|---|---|---|
| TW | 202204057 A | | 2/2022 |
| TW | I768417 B | * | 6/2022 |
| TW | M633283 U | | 10/2022 |
| WO | 2012128745 A | | 9/2012 |

OTHER PUBLICATIONS

Wu; Qisheng, "Novel Dry-Type Wind-Magnetic Combined Magnetic Separator" (English Translation), Jul. 30, 2021, worldwide. espacent.com (Year: 2021).*

\* cited by examiner

SOLAR PANEL RECYCLING AND SORTING MACHINE

BACKGROUND OF THE INVENTION

The present invention relates to a solar panel recycling machine and, more particularly, to a solar panel recycling and sorting machine.

Renewable energy is an alternative source crucial for ensuring the sustainable development of the natural world, and among these, solar energy is one of the key targets. Consequently, countries around the world are promoting the installation of solar photovoltaic modules, leading to a rapid increase in the setup of solar photovoltaic systems. However, this growth trend also reflects the future increase in the number of discarded solar photovoltaic modules, inevitably leading to substantial challenges in handling solar photovoltaic module waste. Currently, there is no adequate technology for processing discarded solar photovoltaic modules domestically, and they are primarily disposed of through burial, which is not only costly but also burdensome to the environment. If discarded solar photovoltaic modules could be recycled, the lower the recycling processing costs and the higher the sale price of recycled materials, the more sustainable and developmental the solar photovoltaic module recycling industry could operate alongside the solar photovoltaic industry. The main current recycling methods can be categorized into physical crushing (dry recycling), chemical solution (wet recycling), and thermal processing.

The crushing method involves directly crushing the solar photovoltaic modules (glass/EVA/solar cells/EVA/back panel) using rollers, hammer, centrifugal wind force, etc. The crushed parts are then screened according to different particle sizes and finally sorted by color or density. Color sorting can separate glass from metal based on transparency, and density sorting can separate inorganics (glass, metal, silicon, etc.) and organics (EVA, back panel, etc.). However, the recycling method that involves crushing and mixing the entire module before proceeding with screening and sorting is inefficient.

Thus, a need exists for a solar panel recycling machine to mitigate and/or obviate the above disadvantages.

SUMMARY OF THE INVENTION

In general, this disclosure describes a solar panel recycling and sorting machine that includes a crushing device and a recycling device. The crushing device is provided with a crushing tank, and the crushing device is configured to project metal particles into the crushing tank. The recycling device includes a first conveyor belt, a first magnetic separator, a recycling tube, and a metal particle container. One end of the first conveyor belt is positioned below the crushing tank in a vertical direction, and the other end of the first conveyor belt is provided with the first magnetic separator. The metal particles from the crushing tank is configured to fall onto the first conveyor belt and be fed into the first magnetic separator. One end of the recycling tube is connected to the first magnetic separator, and the other end of the recycling tube is connected to the metal particle container. The first magnetic separator is configured to sort out the metal particles on the first conveyor belt using magnetic force and direct the metal particles into the recycling tube, allowing the metal particles to enter the metal particle container through the recycling tube.

In one example, the recycling tube is configured to allow air flowing therethrough, and the flowing air in the recycling tube is configured to transport the metal particles from the first magnetic separator to the metal particle container.

In one example, the recycling device further includes a second conveyor belt, a second magnetic separator, and a feeding module. The second conveyor belt is positioned below the metal particle container in the vertical direction. The second magnetic separator is arranged on the second conveyor belt. The metal particles in the metal particle container is configured to fall onto the second conveyor belt and be fed into the second magnetic separator. One end of the feeding module is connected to the second conveyor belt, and the other end of the feeding module is connected to the crushing device. The second magnetic separator is configured to sort out the metal particles on the second conveyor belt using magnetic force and direct the metal particles into the feeding module, allowing the metal particles to enter the crushing device through the feeding module.

In one example, a level height of the crushing tank in the vertical direction is less than a level height of the second conveyor belt in the vertical direction, and the level height of the second conveyor belt in the vertical direction is less than a level height of the metal particle container in the vertical direction.

In one example, the crushing device is a sandblasting equipment.

The present invention will become clearer in light of the following detailed description of illustrative embodiments of this invention described in connection with the drawings.

DETAILED DESCRIPTION OF THE INVENTION

Figure 1:
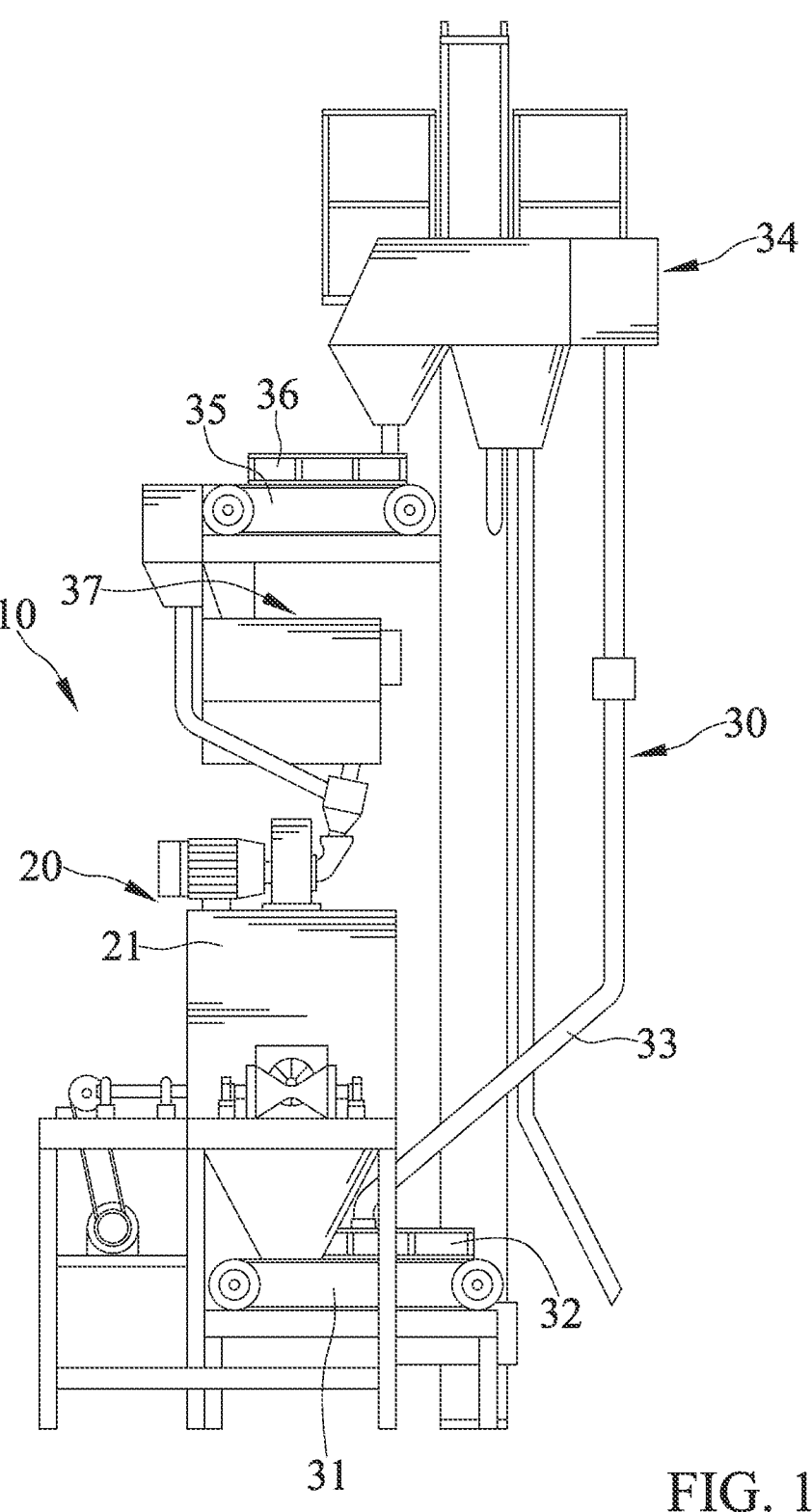
FIG. 1 is a front perspective view of a solar panel recycling and sorting machine of an embodiment according to the present invention.
Figure 2:
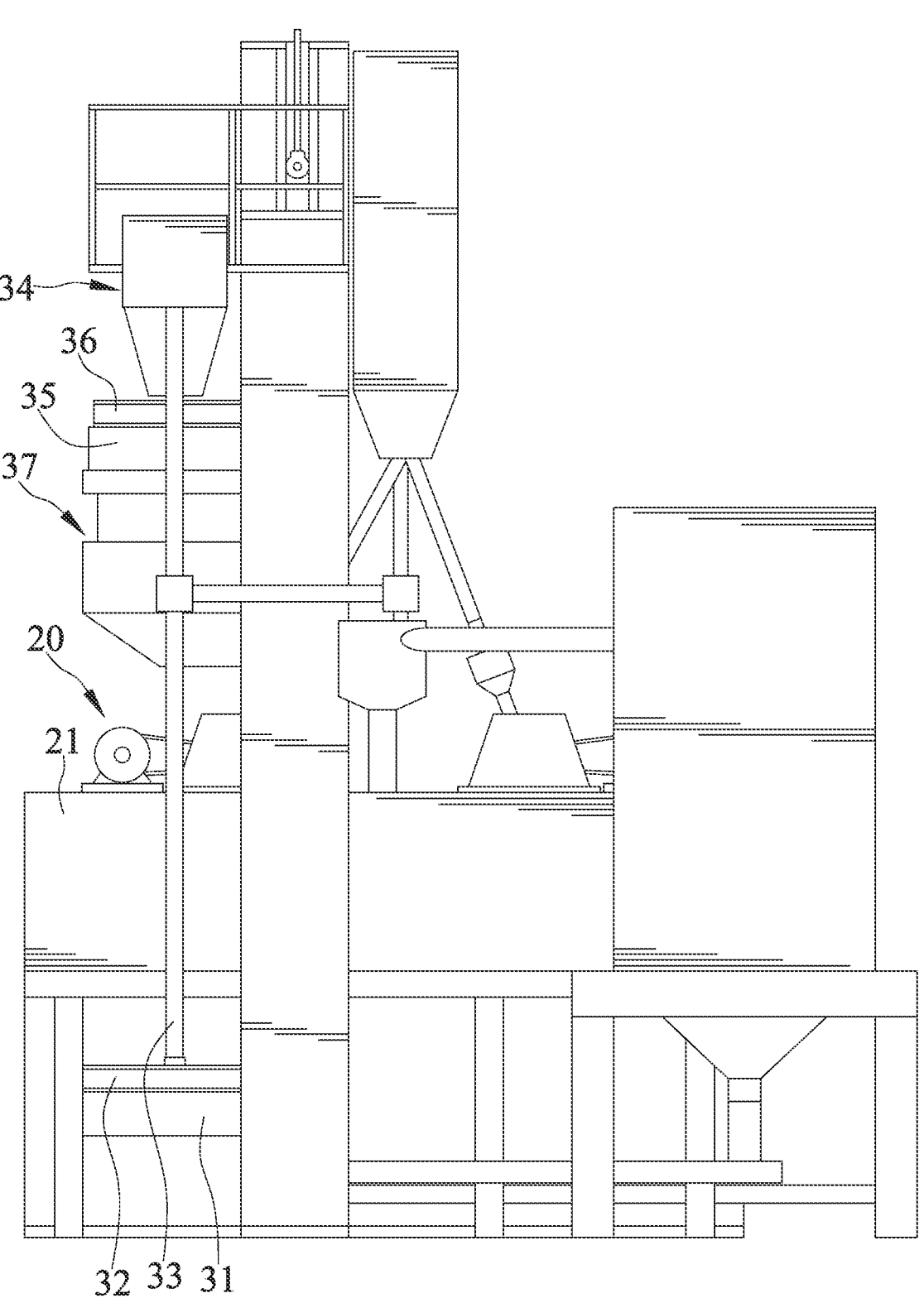
FIG. 2 is a right perspective view of the solar panel recycling and sorting machine of the embodiment according to the present invention.

FIGS. 1 and 2 show a solar panel recycling and sorting machine of an embodiment according to the present invention. The solar panel recycling and sorting machine 10 includes a crushing device 20 and a recycling device 30.

The crushing device 20 is provided with a crushing tank 21, and the crushing device 20 is configured to project metal particles into the crushing tank 21.

The recycling device 30 includes a first conveyor belt 31, a first magnetic separator 32, a recycling tube 33, and a metal particle container 34.

One end of the first conveyor belt 31 is positioned below the crushing tank 21 in a vertical direction, and the other end of the first conveyor belt 31 is provided with the first magnetic separator 32. The metal particles from the crushing tank 21 is configured to fall onto the first conveyor belt 31 and be fed into the first magnetic separator 32. One end of the recycling tube 33 is connected to the first magnetic separator 32, and the other end of the recycling tube 33 is connected to the metal particle container 34. The first magnetic separator 32 is configured to sort out the metal particles on the first conveyor belt 31 using magnetic force and direct the metal particles into the recycling tube 33, allowing the metal particles to enter the metal particle container 34 through the recycling tube 33.

The recycling tube 33 is configured to allow air flowing therethrough, and the flowing air in the recycling tube 33 is configured to transport the metal particles from the first magnetic separator 32 to the metal particle container 34.

The recycling device 30 further includes a second conveyor belt 35, a second magnetic separator 36, and a feeding module 37. The second conveyor belt 35 is positioned below the metal particle container 34 in the vertical direction. The second magnetic separator 36 is arranged on the second conveyor belt 35. The metal particles in the metal particle container 34 is configured to fall onto the second conveyor belt 35 and be fed into the second magnetic separator 36. One end of the feeding module 37 is connected to the second conveyor belt 35, and the other end of the feeding module 37 is connected to the crushing device 20. The second magnetic separator 36 is configured to sort out the metal particles on the second conveyor belt 35 using magnetic force and direct the metal particles into the feeding module 37, allowing the metal particles to enter the crushing device 20 through the feeding module 37.

Further, a level height of the crushing tank 21 in the vertical direction is less than a level height of the second conveyor belt 35 in the vertical direction, and wherein the level height of the second conveyor belt in the vertical direction is less than a level height of the metal particle container 34 in the vertical direction.

In the embodiment, the crushing device 20 may be a sandblasting equipment.

Therefore, the solar panel recycling and sorting machine 10, through the aforementioned structure, is able to only separate out the fiberglass part of the solar panels, avoiding the mixture of various valuable resources and other substances present in the solar panels, which is beneficial for the subsequent disassembly and recycling operations. During the recycling process of solar panels, the solar panels can first be fed into the crushing tank 21, and the metal particles projected by the crushing device 20 can shatter the fragile fiberglass parts of the solar panels, while preserving other parts with higher structural strength (such as the solar panel frame). The shattered fiberglass and the metal particles will fall onto the first conveyor belt 31, and the first magnetic separator 32 then uses magnetic force to separate the fiberglass from the metal particles. After the metal particles are collected in the metal particle container 34, the metal particles can be reused and projected again by the crushing device 20.

Additionally, the second magnetic separator 36 is capable of using magnetic force to sort out the metal particles on the second conveyor belt 35 and direct the metal particles into the feeding module 37. Thus, the metal particles can then enter the crushing device 20 through the feeding module 37 for a second magnetic selection to recycle the metal particles, such as steel sand and steel balls, ensuring that no fiberglass particles are mixed into the crushing device 20.

Although specific embodiments have been illustrated and described, numerous modifications and variations are still possible without departing from the scope of the invention. The scope of the invention is limited by the accompanying claims.

The invention claimed is:

1. A solar panel recycling and sorting machine comprising:
   a crushing device provided with a crushing tank, wherein the crushing device is configured to project metal particles into the crushing tank; and
   a recycling device including a first conveyor belt, a first magnetic separator, a recycling tube, and a metal particle container, wherein one end of the first conveyor belt is positioned below the crushing tank in a vertical direction, and the other end of the first conveyor belt is provided with the first magnetic separator, wherein the metal particles from the crushing tank is configured to fall onto the first conveyor belt and be fed into the first magnetic separator, wherein one end of the recycling tube is connected to the first magnetic separator, and the other end of the recycling tube is connected to the metal particle container, and wherein the first magnetic separator is configured to sort out the metal particles on the first conveyor belt using magnetic force and direct the metal particles into the recycling tube, allowing the metal particles to enter the metal particle container through the recycling tube,
   wherein the recycling device further includes a second conveyor belt, a second magnetic separator, and a feeding module, wherein the second conveyor belt is positioned below the metal particle container in the vertical direction, wherein the second magnetic separator is arranged on the second conveyor belt, wherein the metal particles in the metal particle container is configured to fall onto the second conveyor belt and be fed into the second magnetic separator, wherein one end of the feeding module is connected to the second conveyor belt, and the other end of the feeding module is connected to the crushing device, and wherein the second magnetic separator is configured to sort out the metal particles on the second conveyor belt using magnetic force and direct the metal particles into the feeding module, allowing the metal particles to enter the crushing device through the feeding module.

2. The solar panel recycling and sorting machine as claimed in claim 1, wherein the recycling tube is configured to allow air flowing therethrough, and wherein the flowing air in the recycling tube is configured to transport the metal particles from the first magnetic separator to the metal particle container.

3. The solar panel recycling and sorting machine as claimed in claim 1, wherein a level height of the crushing tank in the vertical direction is less than a level height of the second conveyor belt in the vertical direction, and wherein the level height of the second conveyor belt in the vertical direction is less than a level height of the metal particle container in the vertical direction.

4. The solar panel recycling and sorting machine as claimed in claim 1, wherein the crushing device is a sandblasting equipment.

* * * * *